(12) United States Patent
Halder et al.

(10) Patent No.: US 12,301,384 B2
(45) Date of Patent: May 13, 2025

(54) MACHINE-LEARNING-BASED INTER-FREQUENCY SIGNAL LEVEL ESTIMATION

(71) Applicant: QUALCOMM Incorporated, San Diego, CA (US)

(72) Inventors: Atanu Basudeb Halder, San Diego, CA (US); Rita Enami, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 18/168,637

(22) Filed: Feb. 14, 2023

(65) Prior Publication Data
US 2024/0275637 A1   Aug. 15, 2024

(51) Int. Cl.
*H04L 5/12* (2006.01)
*H04L 25/02* (2006.01)
*H04W 72/0453* (2023.01)

(52) U.S. Cl.
CPC ..... *H04L 25/0204* (2013.01); *H04W 72/0453* (2013.01)

(58) Field of Classification Search
CPC .................. H04L 25/0204; H04W 72/0453
USPC ............... 375/262, 260, 259, 219, 295, 316
See application file for complete search history.

(56) References Cited

U.S. PATENT DOCUMENTS

| 2021/0243608 A1* | 8/2021 | Damnjanovic | ....... H04W 16/14 |
| 2021/0243632 A1* | 8/2021 | Pezeshki | ............... H04W 80/02 |

* cited by examiner

*Primary Examiner* — Zewdu A Kassa
(74) *Attorney, Agent, or Firm* — Patterson & Sheridan, L.L.P/Qualcomm Incorporated

(57) ABSTRACT

Certain aspects of the present disclosure provide techniques and apparatus for inter-frequency signal property prediction using machine learning techniques. An example method generally includes determining one or more properties of a received signal from a wireless device on a first frequency band. An estimate of the one or more properties of signals on a second frequency band is generated, while a transceiver is tuned to the first frequency band, using a machine learning model trained to generate the estimate based on the determined one or more properties of the received signal on the first frequency band. The transceiver is tuned to the second frequency band for subsequent communications with the wireless device based on the estimate of the one or more properties of the signals on the second frequency band.

26 Claims, 8 Drawing Sheets

MACHINE-LEARNING-BASED INTER-FREQUENCY SIGNAL LEVEL ESTIMATION

INTRODUCTION

Aspects of the present disclosure relate to wireless communications, and more particularly, to techniques for signal level estimation using machine learning techniques.

Wireless communication systems are widely deployed to provide various telecommunication services such as telephony, video, data, messaging, broadcasts, etc. These wireless communication systems can support operations on various frequency bands. For example, in a fifth generation (5G) New Radio (NR) system, the operating frequency bands have been organized into two frequency ranges: frequency bands in Frequency Range 1 (FR1) (410 MHz-7.125 GHZ) and frequency bands in Frequency Range 2 (FR2) (24.25 GHz-71.0 GHZ). Although a portion of FR1 is greater than 6 GHz, FR1 is often referred to (interchangeably) as a "sub-6 GHz" band in various documents. A similar nomenclature issue sometimes occurs with regard to FR2, which may be referred to (interchangeably) as a "millimeter wave" ("mmW" or "mmWave") band (despite being different from the extremely high frequency (EHF) band (30 GHz-300 GHz) identified by the International Telecommunications Union as a "millimeter wave" band). Unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Generally, the propagation characteristics of transmissions on different frequency bands differ. Signaling transmitted on FR1 bands, for example, may experience less interference from other signaling and environmental effects than signaling transmitted on FR2 bands, with a corresponding increase in propagation distance for FR1 signals. Further, throughput rates may differ between the FR1 and FR2 bands, with the FR2 bands supporting higher throughput than the FR1 bands due to the higher frequency on which signaling is carried on the FR2 bands relative to the FR1 bands. Because of the different characteristics of wireless communications on different frequency bands, a user equipment (UE) and/or a serving network entity (e.g., a gNodeB (gNB) or other base station) may determine whether to switch frequencies for subsequent communications (e.g., when signal quality on one frequency band has degraded to such an extent that subsequent communications should be performed on a different frequency band). However, determining which frequency band(s) to use for communications may be a time-intensive process, which may impose various delays, processing overhead, and power consumption overhead in making such a determination.

Accordingly, techniques are needed to efficiently determine the frequency band(s) on which particular transmissions are to be performed in a wireless communication system.

BRIEF SUMMARY

Certain aspects of the present disclosure provide a method for wireless communication (e.g., by a user equipment (UE)). The method generally includes determining one or more properties of a received signal from a wireless device on a first frequency band; generating, while tuned to the first frequency band, an estimate of the one or more properties of signals on a second frequency band using a machine learning model trained to generate the estimate based on the determined one or more properties of the received signal on the first frequency band; and tuning a transceiver to the second frequency band for subsequent communications with the wireless device based on the estimate of the one or more properties of the signals on the second frequency band.

Certain aspects of the present disclosure provide a method for training a machine learning model to generate estimates of one or more properties of signals in a wireless communication system. The method generally includes generating a training data set including a plurality of samples, each sample including a pairing of one or more properties of signals on a first frequency band and a distance between a receiver and a transmitter, the pairing being mapped to the one or more properties of signals on a second frequency band. The method also includes training a machine learning model to predict the one or more properties of the signals on the second frequency band based on the generated training data set.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
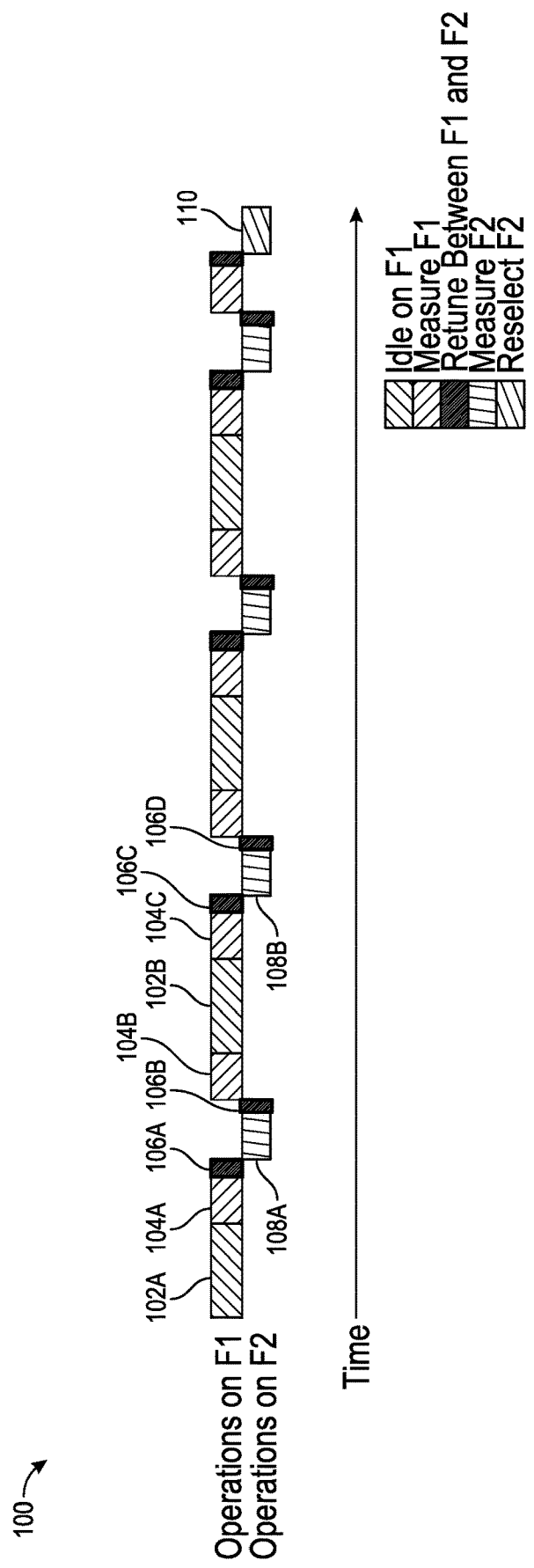
FIG. 1 illustrates an example timeline for selecting a frequency on which to communicate in a wireless communication system based on inter-frequency signal measurements.

Aspects of the present disclosure provide apparatus, methods, processing systems, and computer-readable mediums for inter-frequency signal property prediction using machine learning models.

Generally, properties, such as received signal strength, channel state information (CSI), and the like, of signals transmitted on different frequency ranges generally differ due to the propagation characteristics of signals on these different frequency ranges. For example, at a given transmission power, signals transmitted by a transmitter on frequency bands in the FR1 range may propagate over longer distances, or be received at a higher received power, than signals transmitted from the transmitter on frequency bands in the FR2 range. Even within a frequency range, different frequency bands may exhibit similar differences in the properties of these signals at a receiving device, with signals transmitted on frequency bands at lower frequencies within a frequency range generally being received at a higher received power than signals transmitted on frequency bands at higher frequencies within the frequency range. Because of the different propagation characteristics of signals transmitted on different frequency bands, devices may switch operating frequencies so that communications can be reliably maintained between a transmitter and a receiver in the wireless communication system (e.g., a UE and a gNB in a wireless communication system). However, in order to determine when to migrate communications between a transmitter and a receiver to a different frequency band (whether within a frequency range or across frequency ranges), a device may periodically re-tune a transceiver (or a transmitter) and, in some cases, the associated antennas, in order to measure signals received on different frequency bands and identify a suitable frequency band on which communications are to be performed.

Re-tuning a transceiver and its associated antennas to detect the properties of received signals (e.g., perform signal measurements) on different frequency bands generally involves a processing overhead that may introduce latencies in communications between the transmitter and the receiver on a device. For example, to detect the properties of received signals on a first frequency band while communicating using signaling transmitted on a second frequency band, a transceiver (or a receiver) may be tuned from the second frequency band to the first frequency band, wait for signaling to be received on the first frequency band from another device, and then be re-tuned from the second frequency band to the first frequency band in order to resume communications with the other device in the wireless communication system. The overhead involved in re-tuning a transceiver in order to detect the properties of received signals on other frequency bands may thus decrease throughput and increase the latency of communications in a wireless communication system, as devices may pause communications on one frequency band while detecting the properties of signals carried using other frequency bands.

Aspects of the present disclosure provide techniques for predicting, using trained machine learning models and the detected or measured properties of received signals using a particular frequency band, the properties of signals transmitted using other frequency bands. As discussed in further detail herein, the predictions generated by these machine learning models can be used to determine when a device is to incur the processing overhead of re-tuning to another frequency band and detecting the properties of signals transmitted on this other frequency band (e.g., in preparation for transitioning communications between devices in a wireless communication system from one frequency band to another frequency band). By doing so, aspects of the present disclosure may reduce the number of times a transceiver is re-tuned to different frequency bands to detect the properties of signals on these different frequency bands and determine when to transition communications to one or more other frequency bands. By doing so, aspects of the present disclosure may reduce the latency of communications in a wireless communication system imposed by numerous repeated re-tuning of transceivers in order to receive signals and determine the properties of such signals on different frequency bands and correspondingly reduce power consumption by a device by reducing the rate at which the device re-tunes a transceiver to different frequency bands.

Introduction to Inter-Frequency Signal Property Determination

FIG. 1 illustrates an example timeline 100 for selecting a frequency band on which to communicate in a wireless communication system based on inter-frequency signal measurements. Timeline 100 is illustrated with reference to a user equipment (UE) configured to operate on one or more frequency bands. These frequency bands may be referred to as F1 and F2, and these bands may represent any two frequency bands (e.g., in the same frequency range or in different frequency ranges). Generally, in order to support communications on multiple frequency bands, a UE may periodically generate a signal measurement based on signals (e.g., reference signals) received on the F1 frequency band, tune the operating frequency of a transceiver from F1 to F2, generate a signal measurement based on signals received on the F2 frequency band, retune to F1, and compare the measurement for signals received on the F1 frequency band to signals received on the F2 frequency band. This measurement and tuning process may be performed intermittently so that communications between the UE and another network entity (e.g., a gNodeB) can continue after a time at which it may be desirable to communicate on the F2 frequency band instead of the F1 frequency band.

As illustrated in timeline 100, an idle period 102 (e.g., a radio resource control (RRC) idle state in which a UE can receive broadcast or multicast data from a network entity) may be defined for communications performed between a UE and another network entity on the F1 frequency band. One example of operations that a UE can perform while in an idle period 102 includes intra-frequency measurements illustrated by blocks 104, 106, and 108 in FIG. 1, as discussed in further detail below. For example, during an idle period 102 (e.g., after a first portion 102A of an idle period), the UE may measure received signals on the F1 frequency band during F1 measurement time block 104A. Subsequently, the UE may tune the UE operating frequency to a second frequency band F2 different from F1 at tuning time block 106A.

After tuning the UE operating frequency to F2, the UE generally measures received signals on the F2 frequency band during F2 measurement time block 108A. However, because the UE may be configured to listen for messaging from another network entity on the F1 frequency band during the idle period 102, the UE may not remain tuned to the F2 frequency band. Thus, the UE may re-tune the UE operating frequency band back to the F1 frequency band at tuning time block 106B and then proceed to measure signals received on the F1 frequency band again at F1 measurement time block 104B. Upon next entering another portion 102B of the idle period 102, the process discussed above repeats. Thus, the UE will measure signals on the F1 frequency band during F1 measurement time block 104C, tune to the F2 frequency band at tuning time block 106C, measure signals on the F2 frequency band during F2 measurement time block 108B, tune back to the F1 frequency band at tuning time block 106D, and so on.

While measuring signals received on the F1 and F2 frequency bands may allow for a UE to make a determination (e.g., at reselection time 110) that subsequent operations should be performed on F2 instead of F1 and thus maintain continuity of communications and a continuous connection with other network entities (e.g., a serving base station or serving gNodeB) in a wireless communication system, the procedure illustrated in FIG. 1 may not be efficient. For example, energy may be consumed each time the UE performs a measurement (e.g., wakes up from an idle state to measure reference signals transmitted by another network entity on a broadcast or multicast channel) and each time the UE tunes the UE operating frequency from one frequency band to another frequency band. Thus, the periodic measurement of signals received on different frequency bands may waste energy, for example in situations where the UE may reliably continue to monitor for signaling on the frequency band on which the UE is currently camped. In turn, this periodic measurement may reduce the usable battery life of the UE and otherwise represent an inefficient use of power, which may be an acute problem on devices with limited power sourcing capabilities. Further, because a UE may not be aware of data transmitted on the F1 frequency band during a time in which the UE is tuned to the F2 frequency band, the periodic measurement and tuning illustrated in timeline 100 may increase communications latency, as a UE may ultimately receive messaging transmitted on the F1 frequency band at a later point in time (e.g., after the UE re-tunes the UE operating frequency from the F2 frequency band to the F1 frequency band) than the expected time at which such messaging may have been expected to be received at the UE.

Example Machine-Learning-Based Inter-Frequency Signal Property Prediction

To minimize, or at least reduce, latency and energy utilization that may be incurred using the measurement and tuning timeline 100 illustrated in FIG. 1, aspects of the present disclosure use trained machine learning models to generate estimates of the properties of received signals on a second frequency band based on the determined properties of received signals on a first frequency band. By doing so, aspects of the present disclosure may allow for a UE to continually remain tuned to the first frequency band until such time as it may be desirable (e.g., due to degradation in the quality of signaling received on the first frequency band) to transition communications between the UE and another network entity to a second frequency band. In doing so, aspects of the present disclosure may reduce the number of times a UE re-tunes the UE operating frequency to a different frequency band and performs measurements on different frequency bands, which may result in a corresponding decrease in energy utilization and latency in communications on the first frequency band between the UE and the other network entity.

Figure 2:
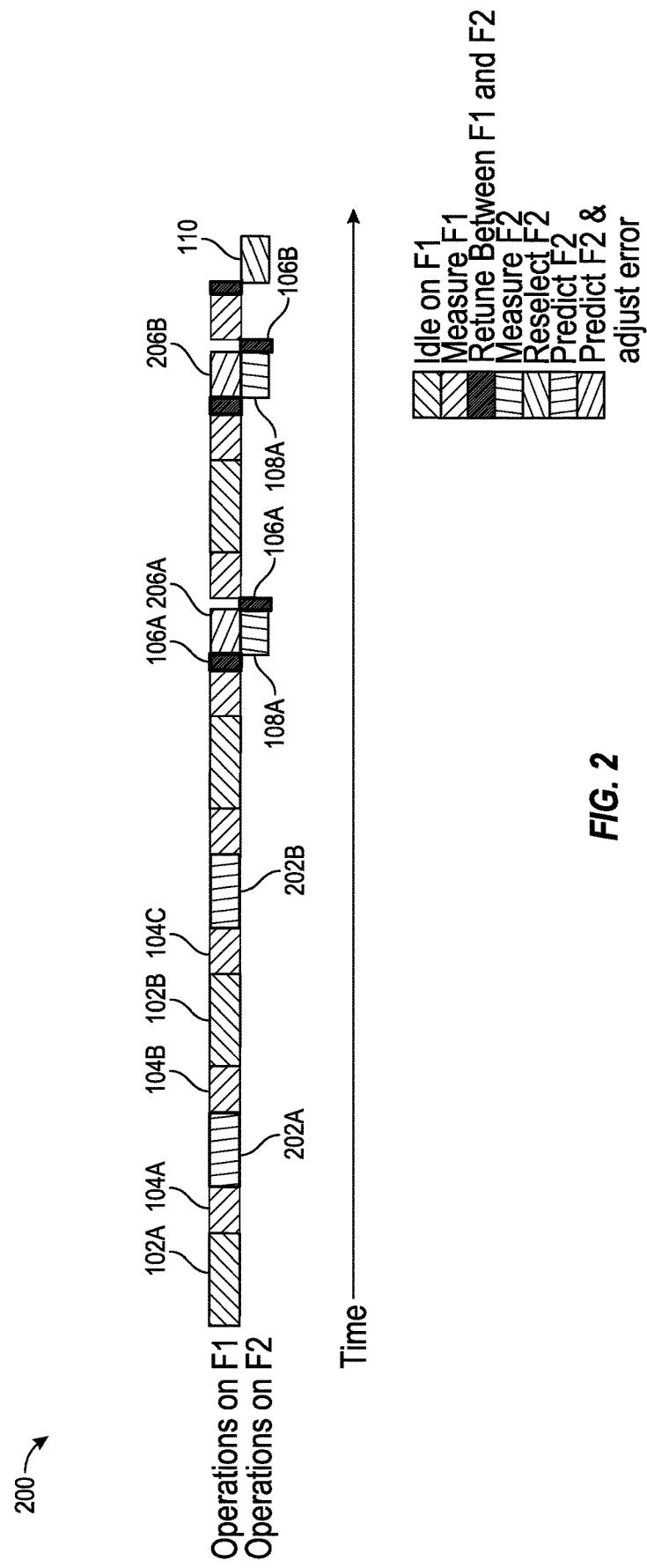
FIG. 2 illustrates an example timeline for selecting a frequency on which to communicate in a wireless communication system based on predicted inter-frequency signal properties generated using a machine learning model, according to aspects of the present disclosure.

FIG. 2 illustrates a timeline 200 for selecting a frequency band on which to communicate in a wireless communication system based on predicted inter-frequency signal properties (e.g., measured signal strength, etc.) generated using a machine learning model, according to aspects of the present disclosure. As illustrated, timeline 200 may begin similarly to timeline 100, in which a UE begins operations in an idle mode and on the F1 frequency band during a first portion 102A of an idle period 102 and proceeds to determine the properties of signals received on the F1 frequency band during F1 measurement time block 104A. However, instead of re-tuning the UE operating frequency band from the F1 frequency band to the F2 frequency band, as illustrated in FIG. 1, the UE may generate a prediction of properties of signals transmitted on the F2 frequency band using a machine learning model during F2 signal property prediction time block 202A. The machine learning model generally is trained, as discussed in further detail herein, to generate the predicted properties (e.g., signal strength measurements, etc.) of signals transmitted on the F2 frequency band based on the determined (e.g., measured) properties of signals transmitted on the F1 frequency band (e.g., the properties obtained during F1 measurement time block 104A). Because a machine learning model is used during F2 signal property prediction time block 202A, the UE may forego the process of retuning the UE operating frequency band from F1 to F2, measure signals received on the F2 frequency band, and retuning the UE operating frequency band from F2 to F1, but instead may continue to operate on the F1 frequency band.

Subsequently, the UE may determine the properties of signals received on the F1 frequency band during F1 measurement time block 104B and then enter an idle mode during another portion 102B of idle period 102. The process of exiting an idle mode at the end of a portion of the idle period 102, determining (measuring) the properties of signals received on the F1 frequency band during F1 measurement time block 104, generating the predicted properties of signals transmitted on the F2 frequency band during F2 signal property prediction time block 202, determining the properties of signals received on the F1 frequency band during another F1 measurement time block, and re-entering an idle state may continue until such time as the UE determines that the difference between the determined properties of signals received on the F1 frequency band and predicted properties of signals received on the F2 frequency band are such that a transition from the F1 frequency band to the F2 frequency band may be warranted. While for simplicity, F2 is illustrated as a single frequency band in FIG. 2, it should be recognized that successive predictions of the properties of signals transmitted on the F2 frequency band may be performed for any number of frequency bands and be performed on the same or on different frequency bands. In another aspect, the UE can determine that the properties of signals received on the F1 frequency band has fallen below a threshold (e.g., below a threshold signal strength) and thus that a transition from the F1 frequency band to the F2 frequency band may be warranted.

At such a time, the UE may both measure the properties of signals received on the F2 frequency band and predict the properties of signals received on the F2 frequency band using a machine learning model in order to determine both: (i) whether the machine learning model is generating accurate predictions of the properties of signals received on the F2 frequency band and (ii) whether to switch the UE operating frequency from the F1 frequency band to the F2 frequency band for subsequent communications with other network entities in the wireless communication system. Thus, as illustrated in timeline 200, a UE may tune the UE operating frequency from the F1 frequency band to the F2 frequency band during tuning time block 106A and determine (e.g., measure) the properties of signals received on the F2 frequency band during F2 measurement time block 108A. The UE may also, during F2 signal property prediction time block 202B, generate the predicted properties of the signals received on the F2 frequency band based on known (measured) properties of signals received on the F1 frequency band. Because the UE has both determined the actual properties of signals received on the F2 frequency band and has generated a prediction of such properties, the UE can use the difference between the determined actual properties of signals received on the F2 frequency band that the generated prediction of such properties to re-train, or at least adjust, the machine learning model and improve the accuracy with which the machine learning model generates future predictions for the properties of signals received at the UE on the F2 frequency band.

In some aspects, the concurrent measurement and generation of predictions for the properties of signals received on the F2 frequency band may be performed until the UE is satisfied that the predictions of the properties of signals received on the F2 frequency band made by the machine learning model are sufficiently accurate (e.g., accurate enough that a UE can rely on such measurements and predictions to transition the operating frequency of the UE from the F1 frequency band to the F2 frequency band). Based on determining that the prediction of properties of the signals received on the F2 frequency is sufficiently accurate and that the difference between the determined properties of signals received on the F1 and F2 frequency bands shows that the UE should transition from operations on the F1 frequency band, the UE can reselect the F2 frequency band at reselection time 110 and subsequently camp on (e.g., communicate with) other network entities in the wireless communication system operating in the F2 frequency band.

In some aspects, a machine learning model used to generate the predictions for the properties of signals received on the F2 frequency band may generate a confidence level associated with the generated predictions. If the predicted properties of the signals received on the F2 frequency band are associated with a confidence level exceeding a first threshold level, in some aspects, the UE can reselect the F2 frequency band and tune the UE's operating frequency band to the F2 frequency band without performing measurements on signals received on the F2 frequency band. If, however, the confidence level associated with the generated predictions is less than a second threshold value, the UE may alternatively determine (e.g., measure) one or more properties of signals received on the F2 frequency band. In such a case, a decision on whether to reselect the F2 frequency band and tune the UE operating frequency band to the F2 frequency band may be performed based both on the generated estimate and the determined properties of signals received on the F2 frequency band. In some cases, the first and second threshold levels may be the same level.

The concurrent measurement and generation of predictions for the properties of signals may allow for performance of the machine learning model to be validated or verified against real-world data. Generally, if the generated predictions for the properties of signals on the F2 frequency band differ from the determined properties of signals on the F2 frequency band by less than a threshold amount, the UE can determine that the machine learning model is generating accurate predictions. If, however, the generated predictions for the properties of signals on the F2 frequency band differ from the determined properties of signals on the F2 frequency band by more than the threshold amount, the difference between the determined properties and generated prediction may be used to refine the machine learning model and improve the accuracy of future predictions of the properties of signals on the F2 frequency band.

Figure 3:
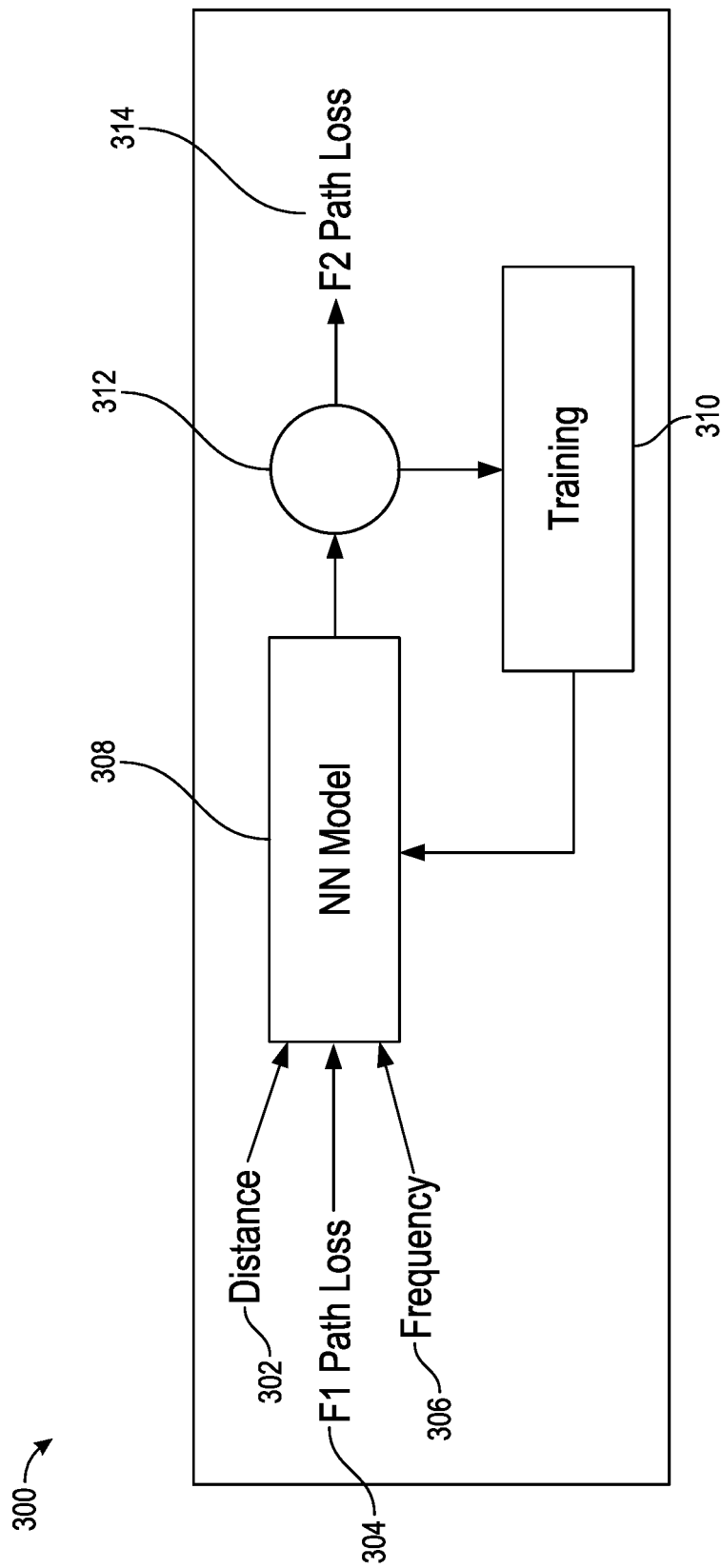
FIG. 3 illustrates a pipeline for training and using a machine learning model to predict signal properties on a second frequency band based on measured signal properties on a first frequency band, according to aspects of the present disclosure.

FIG. 3 illustrates a pipeline 300 for training and using a machine learning model to predict signal properties on a second frequency band based on measured signal properties on a first frequency band, according to aspects of the present disclosure. As illustrated, pipeline 300 includes a neural network model 308 and a training block 310. While pipeline 300 illustrates a neural network model 308, it should be recognized that other machine learning models can be used in conjunction with or in lieu of neural network model 308 illustrated in FIG. 3. Pipeline 300 may be executed, for example, on a UE or on another network entity executing within a wireless communication system.

As shown, neural network model 308 may use distance 302, a measurement 304 (e.g., path loss measurement) on a first frequency band, and frequency data 306 as inputs to generate a signal property prediction 314 on a second frequency band. In some aspects, the measurements of signal properties may also or alternatively include effective radiated power (also known as Equivalent, Isotropically Radiated Power (EIRP)) for the first frequency band and the second frequency band, bandwidth measurements on the first frequency band and the second frequency band, a type of antenna on which signaling is transmitted and/or received on the first frequency band and the second frequency band (e.g., passive antennas, a number of transmit and receive antennas, etc.), and/or other properties that can be predictive of measurements of signal properties on various frequency bands. For example, the first frequency band, on which F1 path loss is measured, may be the 700 MHz frequency band, and the second frequency band, for which F2 path loss is predicted, may be the 3.5 GHz frequency band. However, it should be recognized that neural network model 308 can be used to generate predictions of the properties of signals on any frequency band based on determined properties of signals on any other frequency band. Distance 302 may, in some aspects, correspond to the distance between the receiver (e.g., a UE) and the transmitter (e.g., a gNodeB or other network entity serving the receiver) in a spatial environment. The frequency data 306 may identify the frequency on which signals are received for measurement. The use of distance 302 and frequency data 306 may allow for the machine learning model to learn correlations between reception frequency and the distance over which these signals travel, as signals that are transmitted over the same distance on different frequency bands may generally result in signals transmitted on lower frequency bands having a higher received signal strength than signals transmitted on higher frequency bands.

To train neural network model 308, a training data set may be generated with the input data of distance 302, measurement 304, and frequency data 306 being mapped to a measurement on a different frequency band. During inference operations, the trained neural network model 308 can receive input data including distance 302, measurement 304, and frequency data 306, and generate an output corresponding to the predicted properties of a signal on a frequency band different from the band on which signals were received for measurement 304. In some aspects, the output of neural network model 308 may be processed through one or more linear or nonlinear processing blocks 312 in order to generate the signal property prediction 314 for signals received on the second frequency band.

Training block 310 generally uses the signal property prediction 314 and actual measurements of signals on the second frequency band to re-train the neural network model 308 to generate more accurate inferences and adjust for errors, or differences, between the predicted and actual measurements. This output error correction allows for the neural network model 308 to be iteratively tuned, with a corresponding increase in inference accuracy over time (e.g., as the neural network model 308 is trained with additional data from "edge cases" that may not be encountered frequently).

While neural network model 308 is illustrated in FIG. 3 as generating signal property predictions for signals received on the 3.5 GHz frequency band based on actual measurements for signals received on the 700 MHz frequency band, it should be understood that pipeline 300 can be trained and used to predict the properties of signals received on any frequency band based on actual measurements, distance information, and frequency band information captured for signaling transmitted to the UE on a different frequency band. That is, neural network model 308 may also be trained to generate predictions for signals carried on a third frequency band F3, a fourth frequency band F4, and/or a fifth frequency band F5, and so on, based on determined properties of signals carried on the first frequency F1.

Pipeline 300 may be used to generate inferences in various scenarios. In one example, pipeline 300 may be used to generate predicted properties of signals carried on a first frequency band during communications between a UE and another network entity. In such a case, the generated predictions can be used to determine an optimal time at which the operating frequency band of a UE is to change. In another example, pipeline 300 may be used in various planning scenarios to, for example, identify coverage dead spots at specific radio frequency bands, determine when to consider adding base stations to a network, or the like.

Figure 4:
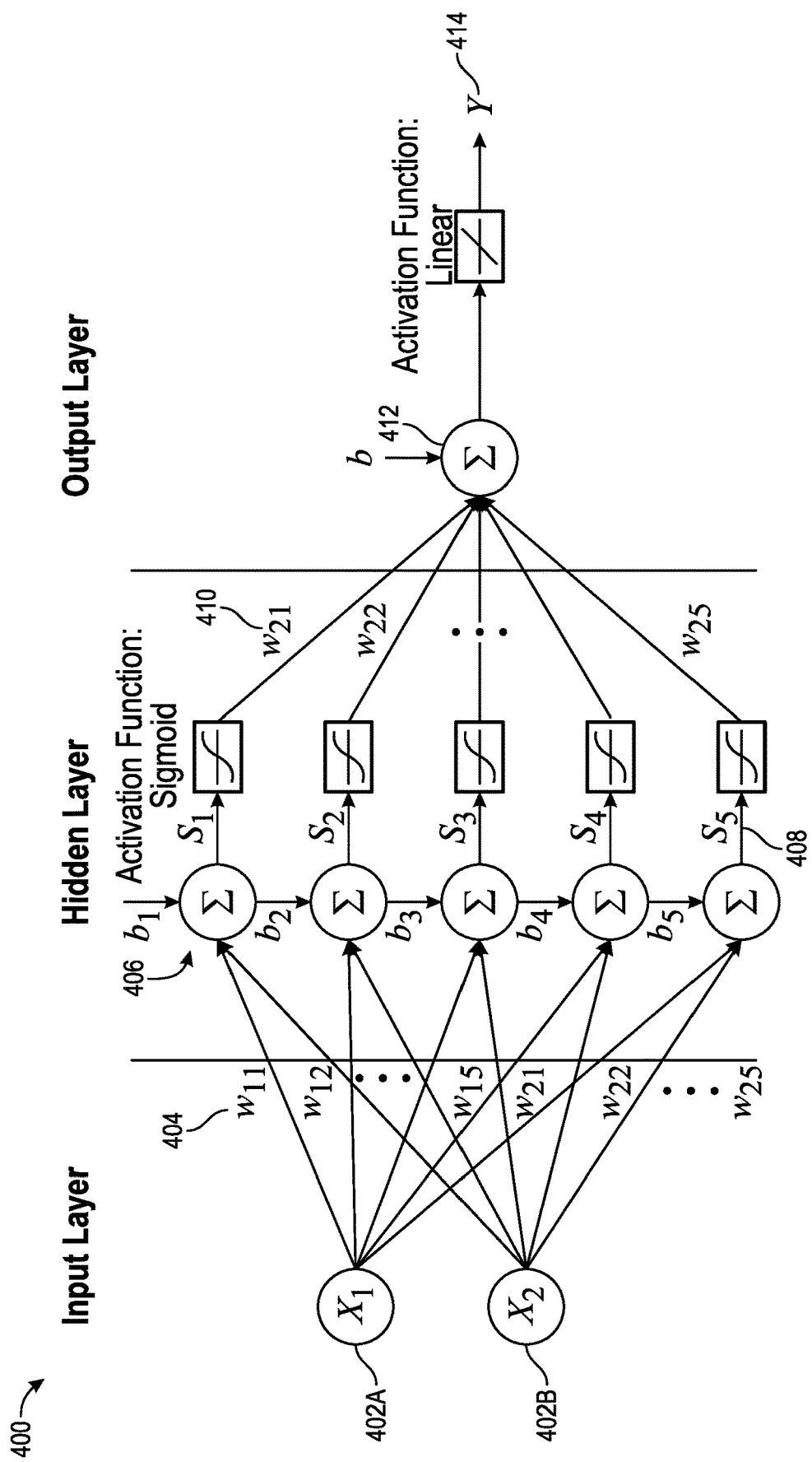
FIG. 4 is a block diagram of a machine learning model trained to generate signal property predictions for signals on a second frequency band based on measured signal properties on a first frequency band, according to aspects of the present disclosure.

FIG. 4 illustrates a block diagram of a machine learning model 400 trained to generate signal property predictions for signals on a second frequency band based on measured signal properties on a first frequency band, according to aspects of the present disclosure. Machine learning model 400 may, in some aspects, correspond to neural network model 308 illustrated in FIG. 3 and discussed above.

As illustrated, machine learning model 400 may be structured as a model with an input layer, a hidden layer, and an output layer. The input layer may include nodes 402 associated with each of a plurality of data inputs, which the machine learning model 400 uses to generate an output 414 of the predicted properties of signals on a second frequency band. For example, the input layer may include a first input node 402A corresponding to a measurement performed on received signals on a first frequency band and/or other properties of signals received on the first frequency band and a second input node 402B corresponding to contextual information about the measurement in first input node 402A. In another example, the inputs to the machine learning model 400 may include the received signal reference power (RSRP) level of signals received on a first frequency band at a given location, illustrated as $X_1$ in first input node 402A, and configuration information associated with the first frequency band, illustrated as $X_2$ in second input node 402B. The nodes 402 may be mapped to each of a plurality of neurons 406 included in the hidden layer based on weights assigned to each pairing of a node 402 corresponding to a data input and a neuron in the hidden layer.

The hidden layer in machine learning model 400 may, in some aspects, be a single layer including five neurons. Each neuron may use weighted inputs and bias values b in order to generate an output s 408. The output s 408 for each neuron 406 in the hidden layer may be processed through an activation function, such as a sigmoid function or the like, and an output of the sigmoid function, modified by a weight 410 associated with each neuron 406 in the hidden layer, may be output to output layer 412. The bias values b may be, for example, a value that is added to the summation of the weighted inputs (amongst other inputs, not illustrated in FIG. 4).

At the output layer, the summation of the weighted outputs of each neuron 406 in the hidden layer may be combined, along with a bias value, to generate an intermediate output for processing. This intermediate output may be processed using an activation function, which may generate an output Y 414 corresponding to the predicted properties of signals received on a second frequency band, as discussed above. Output Y 414 may, for example, correspond to the predicted properties of a signal transmitted on a second frequency band from a transmitter located at the same position as that from which the signals on the first frequency band originated, transmitted from the transmitter using the same (or substantially similar) power level.

In some aspects, machine learning model 400 may be trained using a Levenberg-Marquart training algorithm. The training data set used to train the machine learning model 400 may be randomly divided between training, validation, and testing data; for example, the training data set may be split such that 70 percent of the data is used to train the machine learning model 400, 15 percent of the data is used to validate the machine learning model 400, and 15 percent of the data used to test the inference accuracy of the machine learning model 400 and re-train the machine learning model 400. In some aspects, the model may be trained to minimize, or at least reduce, an error between the predicted properties of signals received on the second frequency band and the actual properties of these signals. In minimizing (reducing) the error between the predicted properties of signals received on the second frequency band and the actual properties of these signals, the model may be trained to do so based on an average error and standard deviation, with larger corrections being applied (e.g., backpropagated through the machine learning model 400) for errors that are further away (e.g., in terms of standard deviation) from the mean error.

In some aspects, the training data set may be generated based on synthetic data. Synthetic data in a training data set may, for example, be generated using ray tracing features provided by a radio planning tool. The data in the synthetic data set may, for example, take into account various features of a (hypothetical) built environment in which a wireless communication system is deployed, such as three-dimensional objects that serve as wave interaction points (e.g., points at which signals are reflected, refracted, and/or absorbed, based on various properties of these objects and the materials from which the objects are constructed) within a built environment. In another example, the training data set may alternatively or additionally include real-life data collected in an environment where a wireless network is deployed, with the measurements having been captured using dedicated measurement devices.

Figure 5:
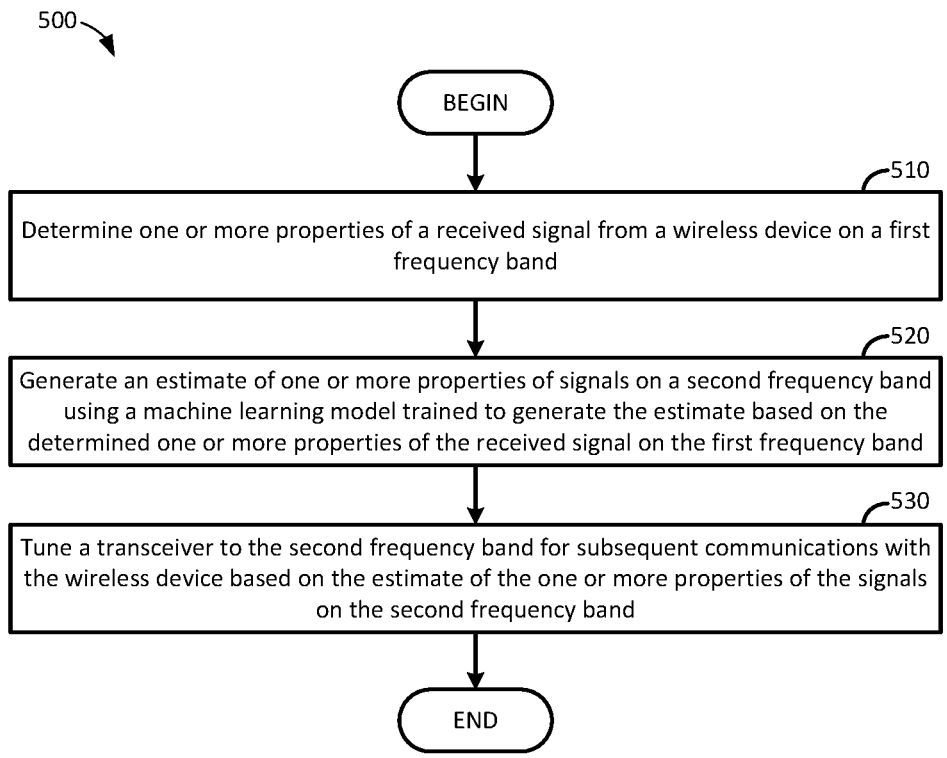
FIG. 5 illustrates example operations for generating signal property predictions for signals on a second frequency band based on measured signal properties on a first frequency band, according to aspects of the present disclosure.

FIG. 5 illustrates example operations 500 for generating an estimate of the properties of received signals from a wireless device on a first frequency band. Operations 500 may be performed, for example, by a computing device on which a neural network may be deployed for use in performing inferences on received signal data in order to generate a prediction of the properties of signals received on a second frequency band based on information about the properties of signals received on a first frequency band. This computing device may include a server, cloud computing resources, one or more computing devices integral to or otherwise co-located with a network entity (e.g., a gNodeB, eNodeB, etc.) serving a user equipment in a wireless network, a user equipment (UE) or other device on which inferences can be generated locally, or the like.

As illustrated, operations 500 may begin at block 510, with determining one or more properties of a received signal from a wireless device on a first frequency band. The received signal may be, for example, reference signals transmitted by the wireless device, such as channel state information reference signals (CSI-RSs), demodulation reference signals (DMRSs), phase tracking reference signals (PTRSs), or other reference signals which may be used to generate channel measurements or otherwise determine the properties of received signals from the wireless device. The determined properties of the received signal from the wireless device on the first frequency band may include, for example, channel state information (CSI) measurements, pathloss measurements defining the amount of power lost in transmission of the signal from a transmitting device to a receiving device, a received signal strength measurement, a reference signal received power (RSRP) measurement, and/or other properties which may provide information about the quality of a connection.

At block 520, operations 500 proceed with generating an estimate of the one or more properties of signals on a second frequency band using a machine learning model trained to generate the estimate based on the determined one or more properties of the received signal on the first frequency band. Generally, the estimate of the one or more properties of signals on the second frequency band is generated without retuning a receiver from the first frequency band to the second frequency band and measuring signals received on the second frequency band.

In some aspects, the estimates of the one or more properties of signals on the second frequency band may be performed according to a timeline for performing inter-frequency measurement. For example, while a UE is in an idle mode, the UE may be configured to determine the properties of signals on a plurality of frequency bands periodically. The UE may, in order to reduce the number of times in which the UE re-tunes the UE operating frequency from a first frequency band, determine the properties of signals received on the first frequency band and estimate the properties of signals received on at least the second frequency band according to the periodicity defined in the timeline.

In some aspects, the machine learning model may be a neural network. The neural network may include a hidden layer with a number of neurons (e.g., five neurons) in the hidden layer. The neural network may be a network trained using Levenberg-Marquart optimization.

In some aspects, the machine learning model may be a model trained to estimate the one or more properties of the signals on the second frequency band on a location-independent basis. The model may, for example, allow for predictions (or estimates) of the one or more properties of the signals on the second frequency band regardless of the environment in which the properties of signals on the first frequency band are determined. Thus, the machine learning model may be generalized such that the estimated properties of signals on the second frequency band may be generated regardless of whether signals are received (or predicted to be received) in a rural environment with few obstructions between devices, in a suburban environment, or an urban environment with complex multipath properties and high levels of signal attenuation due to interference and interaction with various wave interaction points that reflect, refract, and/or attenuate signals in the environment.

At block 530, operations 500 proceed with tuning a transceiver to the second frequency band for subsequent communications with the wireless device based on the estimate of the one or more properties of the signals on the second frequency band.

In some aspects, tuning the transceiver to the second frequency band may be based on a confidence level associated with the estimate of the one or more properties of the signals on the second frequency band. The confidence level associated with the estimate of the one or more properties of the signals on the second frequency band can be compared to a threshold confidence level. Based on determining that the confidence level based on determining that the confidence level associated with the estimate of the one or more properties of the signals on the second frequency band is less than the threshold confidence level, the one or more properties of a received signal on the second frequency band may be determined. The transceiver may be tuned to the second frequency band based on the estimate of the one or more properties of the signals on the second frequency band and the determined one or more properties of the received signal on the second frequency band In some aspects, operations 500 may further include determining one or more properties of a received signal on the second frequency band. The machine learning model may be adjusted based on a difference between the estimate of the one or more properties of the signals on the second frequency band and the determined one or more properties of the received signal on the second frequency band.

In some aspects, the first frequency band may be a camped frequency band on which the transceiver is camped while in an idle mode. The second frequency band may be selected from other frequency bands which the computing device can use to perform communications within a wireless communications system and may be located at a lower frequency band or a higher frequency band than the first frequency band. For example, the first frequency band and the second frequency band may be frequency bands in the same frequency range (e.g., may both be in the FR1 or FR2 frequency range) or may be frequency bands in different frequency ranges (e.g., such that the first frequency band is in the FR1 frequency range while the second frequency band is in the FR2 frequency range, or vice versa).

Figure 6:
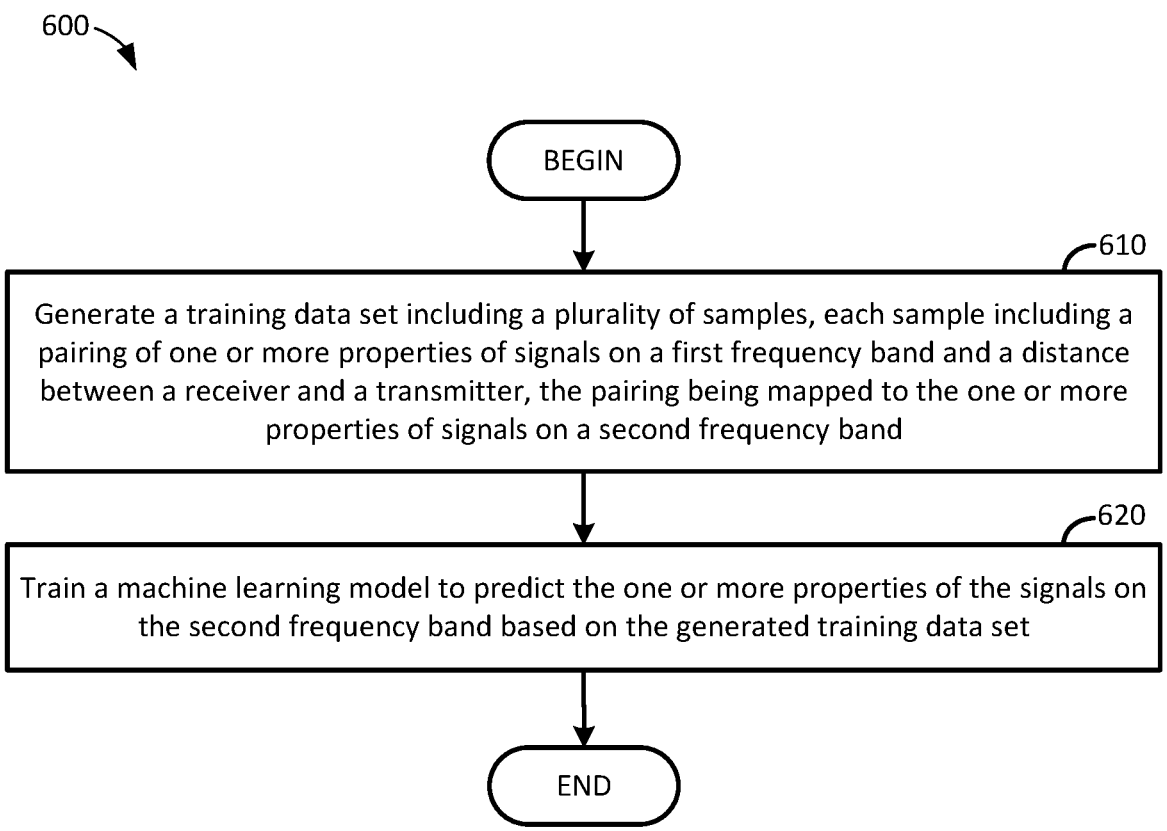
FIG. 6 illustrates example operations for training a machine learning model to generate signal property predictions for signals on a second frequency band based on measured signal properties on a first frequency band, according to aspects of the present disclosure.

FIG. 6 illustrates example operations 600 for training a neural network to predict one or more properties of signals on a second frequency band from measured properties of signals on a first frequency band. Operations 600 may be performed, for example, by a computing device on which a machine learning model or neural network may be trained and which may deploy (e.g., to a server, to a user equipment (UE), or the like) the trained model or neural network for use in performing inferences on received signals.

As illustrated, operations 600 may begin at block 610 with generating a training data set including a plurality of samples. Each sample of the plurality of samples may generally include a pairing of one or more properties of signals on a first frequency band and a distance between a receiver and a transmitter, and each pairing is generally mapped to the (determined or otherwise a priori known) one or more properties of signals on a second frequency band.

In some aspects, the training data set may be generated, at least in part, based on synthesizing the training data set based on a ray tracing estimation of an environment in which a device is to predict the one or more properties of the signals on the second frequency band. The synthesized training data set may, for example, include data associated with a plurality of vectors representing signal interactions in the environment. The environment may be defined by the plurality of vectors, and each vector may be associated with obstructions in the environment. For example, each vector may be associated with a multipath component of a signal transmitted from a transmitter to a receiver in the environment, and each multipath component may represent the path a signal takes from the transmitter to the receiver, including the effects of interactions with the various obstructions in the environment. The various obstructions in the environment may correspond to wave interaction points in the environment, and these wave interaction points may represent points in space with which radio waves interact while on a path between the transmitter and the receiver. Generally, an interaction with such a wave interaction point may include one or more of wave reflection (e.g., a change of direction in which the wave travels), wave refraction (e.g., a change of speed with which the wave travels and a corresponding change in the path over which the wave travels), attenuation, absorption, or the like.

At block 620, operations 600 proceed with training a machine learning model to predict the one or more properties of the signals on the second frequency band based on the generated training data set.

In some aspects, the machine learning model may be a neural network. The neural network may include a hidden layer with a number of neurons (e.g., five neurons) in the hidden layer. The neural network may, in some aspects, be a network trained using Levenberg-Marquart optimization. Of course, it should be recognized that the neural network can be trained using other types of optimization.

In some aspects, the machine learning model may be a model trained to estimate the one or more properties of the signals on the second frequency band on a location-independent basis. The model may, for example, allow for predictions (or estimates) of the one or more properties of the signals on the second frequency band regardless of the environment in which the properties of signals on the first frequency band are determined. Thus, the machine learning model may be generalized such that the estimated properties of signals on the second frequency band may be generated regardless of whether signals are received (or predicted to be received) in a rural environment with few obstructions between devices, in a suburban environment, or an urban environment with complex multipath properties and high levels of signal attenuation due to interference and interaction with various wave interaction points that reflect, refract, and/or attenuate signals in the environment.

Example Processing Systems for Signal Property Inference Using Neural Networks

Figure 7:
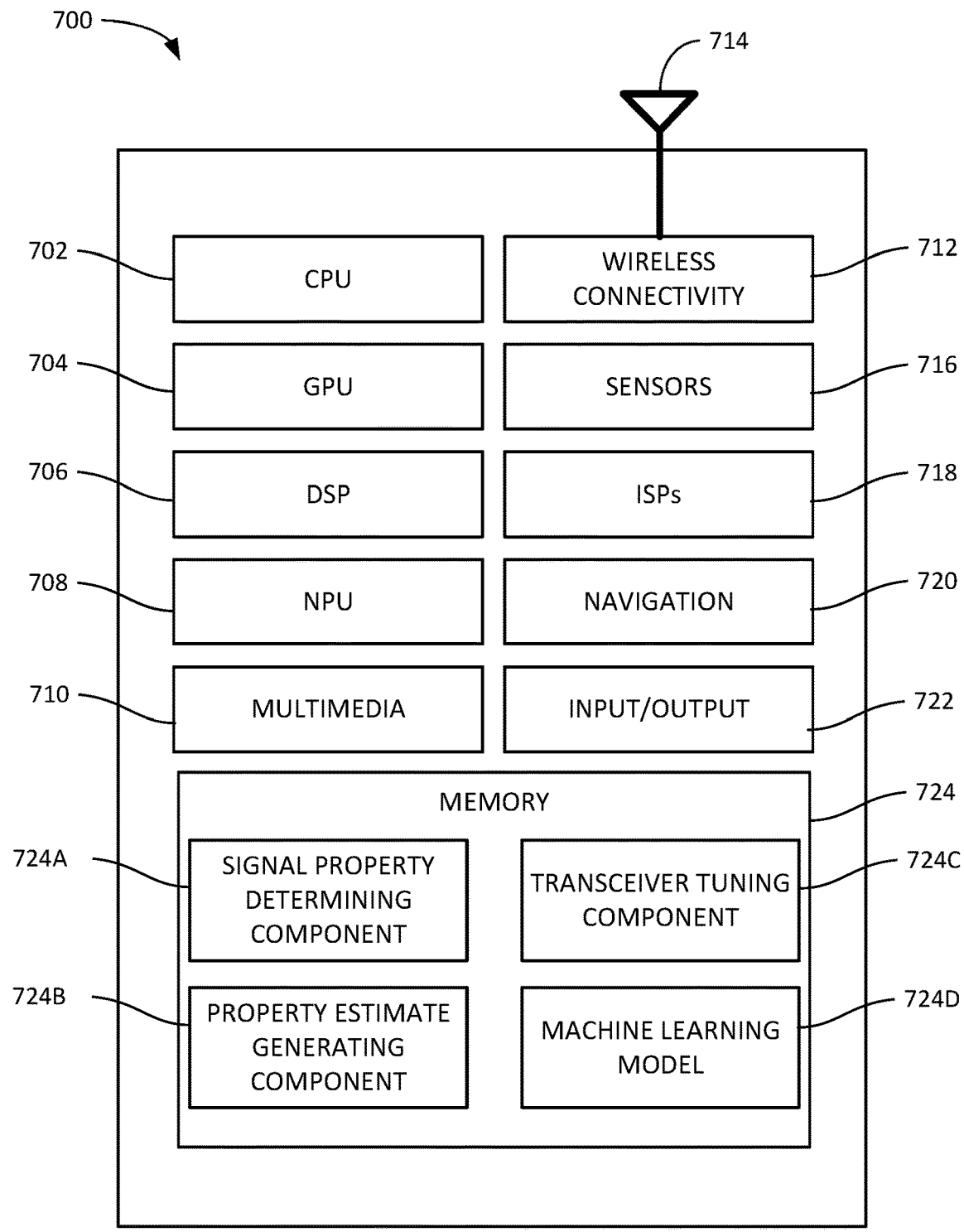
FIG. 7 depicts an example processing system configured to perform various aspects of the present disclosure.

FIG. 7 depicts an example processing system 700 for training a neural network to predict (infer) properties of signals using neural networks, such as described herein for example with respect to FIG. 5.

Processing system 700 includes a central processing unit (CPU) 702, which in some examples may be a multi-core CPU. Instructions executed at the CPU 702 may be loaded, for example, from a program memory associated with the CPU 702 or may be loaded from a memory partition (e.g., of memory 724).

Processing system 700 also includes additional processing components tailored to specific functions, such as a graphics processing unit (GPU) 704, a digital signal processor (DSP) 706, a neural processing unit (NPU) 708, and a connectivity component 712.

An NPU, such as NPU 708, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 708 is a part of one or more of CPU 702, GPU 704, and/or DSP 706. These may be located on a UE or another computing device.

In some examples, connectivity component 712 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. Connectivity component 712 may be further coupled to one or more antennas (not shown).

In some examples, one or more of the processors of processing system 700 may be based on an ARM or RISC-V instruction set.

Processing system 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of processing system 700.

In particular, in this example, memory 724 includes signal property determining component 724A, property estimate generating component 724B, channel transceiver tuning component 724C, and machine learning model 724D. The depicted components, and others not depicted, may be configured to perform various aspects of the methods described herein.

Generally, processing system 700 and/or components thereof may be configured to perform the methods described herein.

Figure 8:
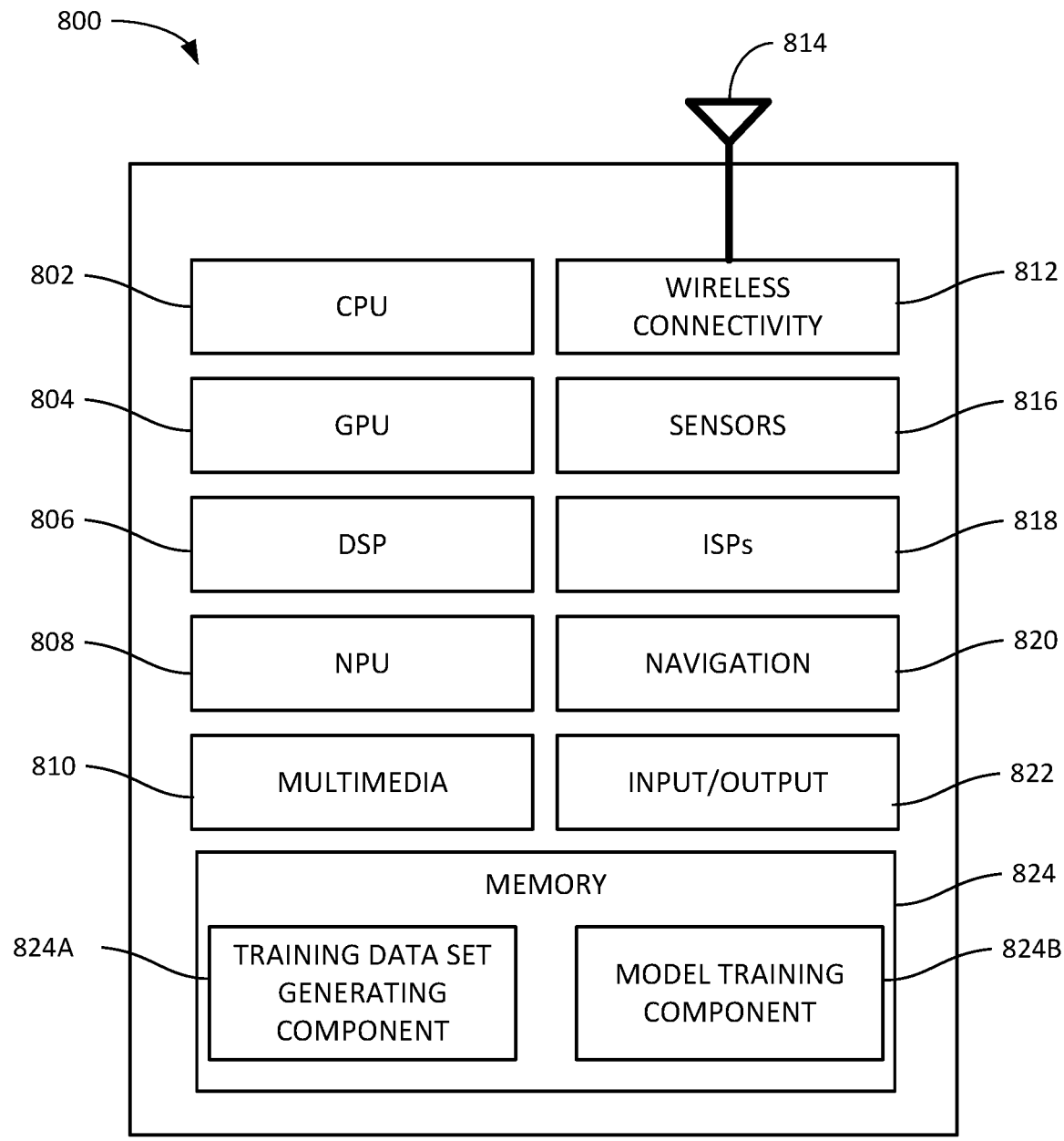
FIG. 8 depicts an example processing system configured to perform various aspects of the present disclosure.

FIG. 8 depicts an example processing system 800 for signal input property prediction using machine learning models, such as described herein for example with respect to FIG. 6.

Processing system 800 includes a central processing unit (CPU) 802 and may include additional processing components tailored to specific functions, such as a graphics processing unit (GPU) 804, a digital signal processor (DSP) 806, a neural processing unit (NPU) 808, a multimedia processing unit 810, and a wireless connectivity component 812. CPU 802, GPU 804, DSP 806, and NPU 808 may be similar to CPU 702, GPU 704, DSP 706, and NPU 708 discussed above with respect to FIG. 7.

In some examples, wireless connectivity component 812 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. Wireless connectivity component 812 is further coupled to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes training data set generating component 824A and model training component 824B. The depicted components, and others not depicted, may be configured to perform various aspects of the methods described herein.

Generally, processing system 800 and/or components thereof may be configured to perform the methods described herein.

Notably, in other aspects, features of processing system 800 may be omitted, such as where processing system 800 is a server computer or the like. For example, multimedia processing unit 810, wireless connectivity component 812, sensor processing units 816, ISPs 818, and/or navigation processor 820 may be omitted in other aspects. Further, aspects of processing system 800 may be distributed, such as training a model and using the model to generate inferences, such as user verification predictions.

Example Clauses

Implementation examples are described in the following numbered clauses:

Clause 1: A computer-implemented method, comprising: determining one or more properties of a received signal from a wireless device on a first frequency band; generating, while tuned to the first frequency band, an estimate of the one or more properties of signals on a second frequency band using a machine learning model trained to generate the estimate based on the determined one or more properties of the received signal on the first frequency band; and tuning a transceiver to the second frequency band for subsequent communications with the wireless device based on the estimate of the one or more properties of the signals on the second frequency band.

Clause 2: The method of Clause 1, further comprising: determining the one or more properties of a received signal on the second frequency band; and adjusting the machine learning model based on a difference between the estimate of the one or more properties of the signals on the second frequency band and the determined one or more properties of the received signal on the second frequency band.

Clause 3: The method of Clause 1 or 2, wherein tuning the transceiver to the second frequency band is based on a confidence level associated with the estimate of the one or more properties of the signals on the second frequency band.

Clause 4: The method of Clause 3, further comprising: determining that the confidence level associated with the estimate of the one or more properties of the signals on the second frequency band is less than a threshold confidence level; and based on determining that the confidence level associated with the estimate of the one or more properties of the signals on the second frequency band is less than the threshold confidence level, determining the one or more properties of a received signal on the second frequency band, wherein tuning the transceiver to the second frequency band is further based on the determined one or more properties of the received signal on the second frequency band.

Clause 5: The method of any of Clauses 1 through 4, wherein the machine learning model comprises a neural network having a hidden layer with five neurons in the hidden layer.

Clause 6: The method of Clause 5, wherein the neural network comprises a network trained using Levenberg-Marquart optimization.

Clause 7: The method of any of Clauses 1 through 6, wherein the machine learning model comprises a model trained to estimate the one or more properties of the signals on the second frequency band on a location-independent basis.

Clause 8: The method of any of Clauses 1 through 7, wherein generating the estimate of the one or more properties of the signals on the second frequency band is performed according to a timeline for performing inter-frequency measurement.

Clause 9: The method of any of Clauses 1 through 8, wherein the one or more properties comprise one or more of a received signal strength or a reference signal received power (RSRP) measurement.

Clause 10: The method of any of Clauses 1 through 9, wherein the first frequency band comprises a camped frequency band on which the transceiver is camped while in an idle mode.

Clause 11: A computer-implemented method, comprising: generating a training data set including a plurality of samples, each sample including a pairing of one or more properties of signals on a first frequency band and a distance between a receiver and a transmitter, the pairing being mapped to the one or more properties of signals on a second frequency band; and training a machine learning model to predict the one or more properties of the signals on the second frequency band based on the generated training data set.

Clause 12: The method of Clause 11, wherein the machine learning model comprises a neural network having a hidden layer with five neurons in the hidden layer.

Clause 13: The method of Clause 12, wherein the neural network comprises a network trained using Levenberg-Marquart optimization.

Clause 14: The method of any of Clauses 11 through 13, wherein the machine learning model comprises a model trained to estimate the one or more properties of the signals on the second frequency band on a location-independent basis.

Clause 15: The method of any of Clauses 11 through 14, wherein generating the training data set comprises synthesizing the training data set based on ray tracing estimation of an environment.

Clause 16: The method of Clause 15, wherein the environment is defined based on vectors associated with obstructions in the environment.

Clause 17: A system, comprising: a memory having executable instructions stored thereon; and a processor configured to execute the executable instructions in order to cause the system to perform the operations of any of Clauses 1 through 16.

Clause 18: A system, comprising means for performing the operations of any of Clauses 1 through 16.

Clause 19: A computer-readable medium having instructions stored thereon which, when executed by a processor, perform the operations of any of Clauses 1 through 16.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
determining one or more properties of a received signal from a wireless device on a first frequency band;
generating, while tuned to the first frequency band, an estimate of the one or more properties of signals on a second frequency band using a machine learning model trained to generate the estimate based on the determined one or more properties of the received signal on the first frequency band;
tuning a transceiver to the second frequency band for subsequent communications with the wireless device based on the estimate of the one or more properties of the signals on the second frequency band, wherein tuning the transceiver to the second frequency band is based on a confidence level associated with the estimate of the one or more properties of the signals on the second frequency band;
determining that the confidence level associated with the estimate of the one or more properties of the signals on the second frequency band is less than a threshold confidence level; and
based on determining that the confidence level associated with the estimate of the one or more properties of the signals on the second frequency band is less than the threshold confidence level, determining the one or more properties of a received signal on the second frequency band, wherein tuning the transceiver to the second frequency band is further based on the determined one or more properties of the received signal on the second frequency band.

2. The method of claim 1, further comprising:
determining the one or more properties of a received signal on the second frequency band; and
adjusting the machine learning model based on a difference between the estimate of the one or more properties of the signals on the second frequency band and the determined one or more properties of the received signal on the second frequency band.

3. The method of claim 1, wherein the machine learning model comprises a neural network having a hidden layer with five neurons in the hidden layer.

4. The method of claim 3, wherein the neural network comprises a network trained using Levenberg-Marquart optimization.

5. The method of claim 1, wherein the machine learning model comprises a model trained to estimate the one or more properties of the signals on the second frequency band on a location-independent basis.

6. The method of claim 1, wherein generating the estimate of the one or more properties of the signals on the second frequency band is performed according to a timeline for performing inter-frequency measurement.

7. The method of claim 1, wherein the one or more properties comprise one or more of a received signal strength or a reference signal received power (RSRP) measurement.

8. The method of claim 1, wherein the first frequency band comprises a camped frequency band on which the transceiver is camped while in an idle mode.

9. A computer-implemented method, comprising:
generating a training data set including a plurality of samples, each sample including a pairing of one or more properties of signals on a first frequency band and a distance between a receiver and a transmitter, the pairing being mapped to the one or more properties of signals on a second frequency band; and
training a machine learning model to predict the one or more properties of the signals on the second frequency band based on the generated training data set.

10. The method of claim 9, wherein the machine learning model comprises a neural network having a hidden layer with five neurons in the hidden layer.

11. The method of claim 10, wherein the neural network comprises a network trained using Levenberg-Marquart optimization.

12. The method of claim 9, wherein the machine learning model comprises a model trained to estimate the one or more properties of the signals on the second frequency band on a location-independent basis.

13. The method of claim 9, wherein generating the training data set comprises synthesizing the training data set based on ray tracing estimation of an environment.

14. The method of claim 13, wherein the environment is defined based on vectors associated with obstructions in the environment.

15. A system, comprising:
a memory having executable instructions stored thereon; and
a processor configured to execute the executable instructions in order to cause the system to:
determine one or more properties of a received signal from a wireless device on a first frequency band;
generate, while tuned to the first frequency band, an estimate of the one or more properties of signals on a second frequency band using a machine learning model trained to generate the estimate based on the determined one or more properties of the received signal on the first frequency band;
tune a transceiver to the second frequency band for subsequent communications with the wireless device based on the estimate of the one or more properties of the signals on the second frequency band, wherein the processor is configured to execute the executable instructions in order to cause the system to tune the transceiver to the second frequency band based on a confidence level associated with the estimate of the one or more properties of the signals on the second frequency band;
determine that the confidence level associated with the estimate of the one or more properties of the signals on the second frequency band is less than a threshold confidence level; and
determine, based on determining that the confidence level associated with the estimate of the one or more properties of the signals on the second frequency band is less than the threshold confidence level, the one or more properties of a received signal on the second frequency band, wherein processor is configured to execute the executable instructions in order to cause the system to tune the transceiver to the second frequency band further based on the determined one or more properties of the received signal on the second frequency band.

16. The system of claim 15, wherein the processor is further configured to cause the system to:
determine the one or more properties of a received signal on the second frequency band; and
adjust the machine learning model based on a difference between the estimate of the one or more properties of the signals on the second frequency band and the determined one or more properties of the received signal on the second frequency band.

17. The system of claim 15, wherein the machine learning model comprises a neural network having a hidden layer with five neurons in the hidden layer.

18. The system of claim 17, wherein the neural network comprises a network trained using Levenberg-Marquart optimization.

19. The system of claim 15, wherein the machine learning model comprises a model trained to estimate the one or more properties of the signals on the second frequency band on a location-independent basis.

20. The system of claim 15, wherein the processor is configured to execute the executable instructions in order to cause the system to generate the estimate of the one or more properties of the signals on the second frequency band according to a timeline for performing inter-frequency measurement.

21. The system of claim 15, wherein the one or more properties comprise one or more of a received signal strength or a reference signal received power (RSRP) measurement.

22. The system of claim 15, wherein the first frequency band comprises a camped frequency band on which the transceiver is camped while in an idle mode.

23. A system, comprising:
a memory having executable instructions stored thereon; and
a processor configured to execute the executable instructions in order to cause the system to:
generate a training data set including a plurality of samples, each sample including a pairing of one or more properties of signals on a first frequency band and a distance between a receiver and a transmitter, the pairing being mapped to the one or more properties of signals on a second frequency band; and
train a machine learning model to predict the one or more properties of the signals on the second frequency band based on the generated training data set.

24. The system of claim 23, wherein the machine learning model comprises a neural network having a hidden layer with five neurons in the hidden layer.

25. The system of claim 23, wherein the machine learning model comprises a model trained to estimate the one or more properties of the signals on the second frequency band on a location-independent basis.

26. The system of claim 23, wherein in order to generate the training data set, the processor is configured to execute the executable instructions in order to cause the system to synthesize the training data set based on ray tracing estimation of an environment.

* * * * *